(12) United States Patent
McFadden et al.

(10) Patent No.: US 6,178,964 B1
(45) Date of Patent: Jan. 30, 2001

(54) FLUID HEATING APPARATUS

(75) Inventors: David H. McFadden, Lexington; Anthony Patti, Wakefield, both of MA (US); Steven J. Savage, Concord, NH (US); David W. Tucci, Northfield, NH (US); Anthony F. Reale, Center Barnstead, NH (US)

(73) Assignee: Gas Research Institute, Chicago, IL (US)

( * ) Notice: Under 35 U.S.C. 154(b), the term of this patent shall be extended for 0 days.

(21) Appl. No.: 09/408,880

(22) Filed: Sep. 29, 1999

(51) Int. Cl.[7] .................................................. A47J 37/12
(52) U.S. Cl. ...................................... 126/391.1; 126/91 A
(58) Field of Search .......................... 126/391.1, 110 R, 126/91 A, 116 R; 122/18.3, 18.31, 51; 432/209

(56) References Cited

U.S. PATENT DOCUMENTS

| | | | |
|---|---|---|---|
| 2,124,186 | * 7/1938 | Childs | 126/391.1 |
| 2,176,869 | * 10/1939 | Childs | 126/391.1 |
| 2,429,360 | * 10/1947 | Kells | 126/391.1 |
| 2,666,427 | * 1/1954 | Keating | 126/391.1 |
| 2,712,308 | * 7/1955 | Keating | 126/91 A |
| 6,027,333 | * 2/2000 | Fujii et al. | 126/91 A |

* cited by examiner

*Primary Examiner*—Ira S. Lazarus
*Assistant Examiner*—Sara Clarke
(74) *Attorney, Agent, or Firm*—Pauley Petersen Kinne & Fejer

(57) ABSTRACT

A natural draft combustion system having a housing enclosing at least a portion of a material heating container and at least one combustion space in heat exchange relation with the material heating container and extending from a heat inlet side of the housing to a heat outlet side of the housing. A downward angled burner having a burner outlet in fluid communication with a heat inlet to the at least one combustion space is disposed on the heat inlet side. A natural draft combustion products exhaust conduit in fluid communication with the at least one combustion space is disposed proximate the heat outlet of the housing. As a result, a flame produced by the burner is introduced into the combustion space with a downward velocity component, which, in turn, results in improved efficiency over comparable conventional systems.

13 Claims, 2 Drawing Sheets

FLUID HEATING APPARATUS

BACKGROUND OF THE INVENTION

1. Field of the Invention

This invention relates to a heating apparatus comprising a natural draft combustion system for heating fluids. More particularly, this invention relates to a heating apparatus for heating fluids used in cooking, such as a fryer in which cooking oil is the cooking medium.

2. Description of Prior Art

Conventional fluid heating apparatuses, such as fryers, employing natural draft combustion systems include a container or tank for containmnent of the fluid being heated, at least one combustion chamber or space in heat exchange relation with the container or tank and having a heat inlet and a combustion products outlet, and an inspirator-type burner for combustion of a fuel in said combustion space, generating heat for transfer into said fluid. Conventional fryers typically employ a plurality of combustion spaces, normally in the form of flame tubes or fire tubes, each of which has a corresponding burer for combustion of the fuel therein.

In conventional fryers, the buner for a corresponding combustion space or tube is located at the front of the fryer within a space defined by the front of the housing/controls area and the front wall of the fluid container, that is at the heat inlet to the tube. To optimize the heat exchange between the products of combustion resulting from combustion of the fuel provided by the burer to the tube and the fluid to be heated, the length of the tube, which constitutes the primary heat exchange means, is maximized, allowing enough space for a flue box, or combustion products outlet or exhaust, but resulting in a minimum amount of space for the burner.

Due to the minimal amount of space provided for the burner, natural draft fryer design has evolved whereby right angle burners (FIG. 1a) and in-shot burners (FIG. 1b) that fire in a horizontal direction are used. However, from an overall product design, neither of these configurations are particularly desirable.

In particular, the right angle burners intrude into the space below and in front of the fry tank, thereby making servicing difficult and eliminating valuable space that could be used by other fryer system elements, for example oil filters. Furthermore, the right angle geometry results in a complex manufacturing task because it is necessary that gas lines and manifolds be positioned far below the fluid container.

Horizontal in-shot burners are less than ideal due to the fact that their short length results in fryer designs with reduced fuel input (Btu/hr) per combustion space or tube in order to maintain a reasonable efficiency. This, in turn, results in in-shot burners having either lower input ratings for reasonable efficiency, lower efficiency for a typical fuel input, or more tubes to achieve the desired input and efficiency, thereby creating cleaning and manufacturing issues.

SUMMARY OF THE INVENTION

Thus, it is one object of this invention to provide a fluid heating apparatus, such as a fryer, which is capable of operating at improved efficiency compared to conventional such apparatuses while maintaining substantially the same heat input rate per combustion space or tube.

It is another object of this invention to provide a fluid heating apparatus which is capable of operating at improved efficiency compared to conventional such apparatuses wit hout having to alter the dimensions of the apparatus—in the case of a fryer, the oil capacity, cooking zone, number of combustion spaces or tubes and overall appliance dimensions.

These and other objects of this invention are ad dressed by a fluid heating apparatus comprising a housing enclosing at least a portion of a material or fluid heating container (tank) and at least one combustion space or chamber in heat exchange relation with the material heating container and extending from a heat inlet side of the housing to a combustion products outlet side of the housing. A downward angled burner is disposed on the heat inlet side of the housing and comprises a burner outlet or face in fluid communication with a heat inlet to the at least one combustion space, whereby a flame resulting from combustion of a fuiel flowing through the burner has a downward velocity component. For removal of the combustion products from the at least one combustion space, a natural draft combustion products exhaust conduit in fluid communication with the at least one combustion space proximate the heat outlet side of the housing is provided. In accordance with one particularly preferred embodiment of this invention, the burner is angled at least 10° above horizontal.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

Although the fluid heating apparatus of this invention will be described herein in terms of the exemplary application of a hot oil fryer for cooking food, there is no intent to limit the scope of the invention claimed herein to such fryers. Rather, all heating apparatuses falling within the scope of the claims are to be considered as part of this disclosure.

Figure 1B:
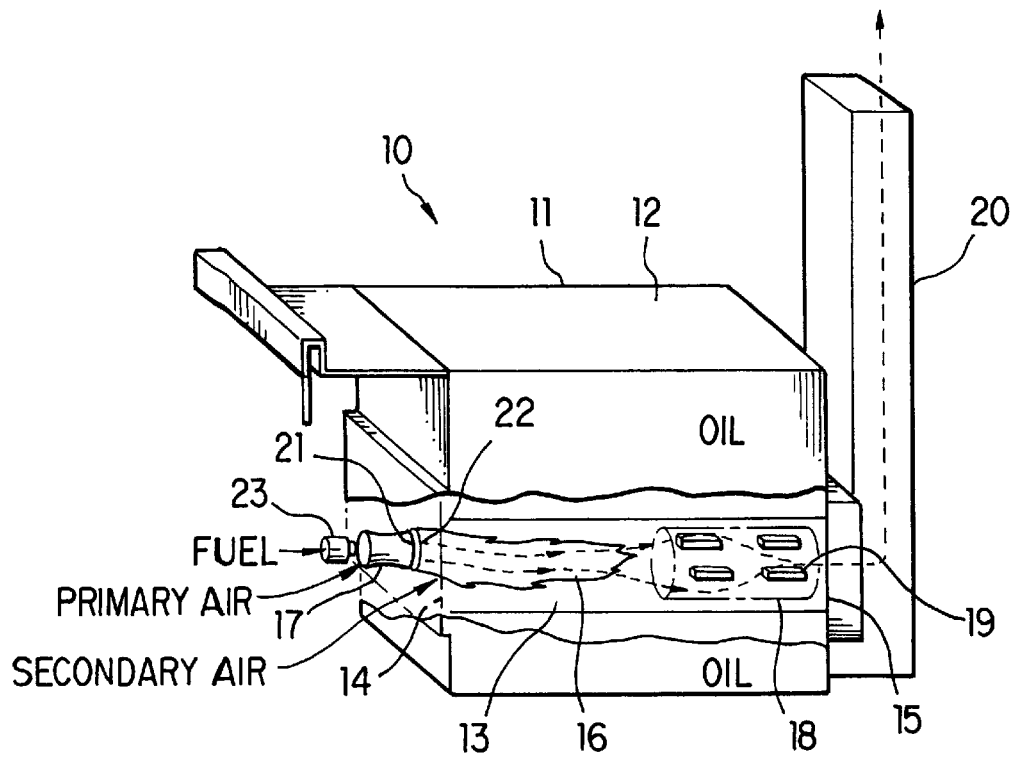
FIG. 1b is a diagram of a conventional fluid heating apparatus having a horizontal in-shot burner.
Figure 1A:
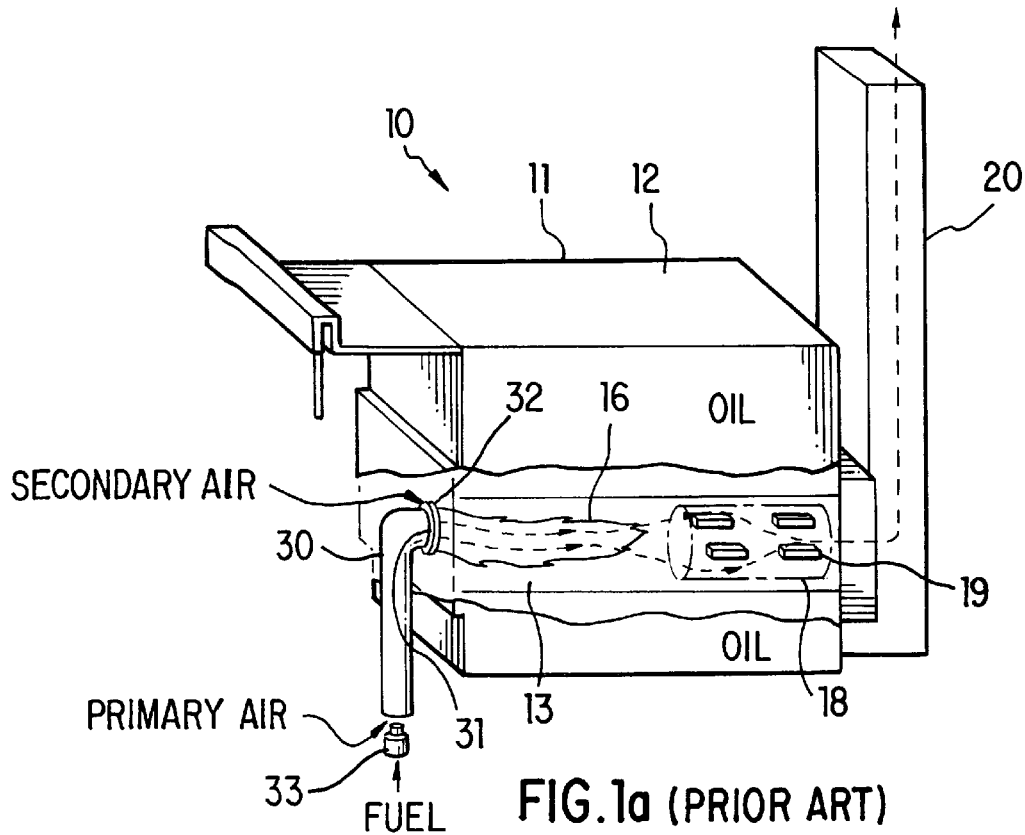
FIG. 1a is a diagram of a conventional fluid heating apparatus having a right angle burner.

A conventional hot oil fryer for deep frying of food is shown in FIGS. 1a and 1b. As shown, a conventional hot oil fryer 10 comprises a housing 11 which encloses at least a portion of a material heating container 12, in the instant case an oil container or tank. Also enclosed by housing 11 is a combustion space or chamber 13 which extends from a heat inlet side 14 to a heat outlet side 15 of housing 11. A natural draft or inspirator-type burner 17, 30 comprising a burner outlet 21, 31 in fluid communication through heat inlet 22, 32 formed by housing 11 with combustion space 13 is disposed on heat inlet side 14. As previously stated, burner 17, 30 is an inspirator-type burner in which the flow of fuel through an orifice formed by manifold 23, 33 draws primary combustion air into the fuel stream for mixing therewith. As shown, burner outlet 21, 31 is offset slightly from heat inlet 22, 32 thereby enabling secondary combustion air as required for complete combustion of the fuel to be drawn through heat inlet 22, 32 into combustion space 13. Although combustion space 13 may take several forms, in hot oil fryers combustion space 13 is in the form of a fire tube or flame tube. Heat generated by the combustion of fuel in the fire tube passes through the tube walls and into the oil to be heated. Disposed on the heat outlet side 15 of housing 11 and in fluid communication with combustion space 13 is combustion products exhaust conduit 20 through which the products of combustion from the combustion space 13 are exhausted.

As shown in FIG. 1a, fuel is introduced into combustion space 13 through right angle burner 30. As shown in FIG. 1b, the burner is a horizontally disposed in-shot burner. In both cases, the flame resulting from the combustion of the fuel has a substantially horizontal velocity component.

Figure 2:
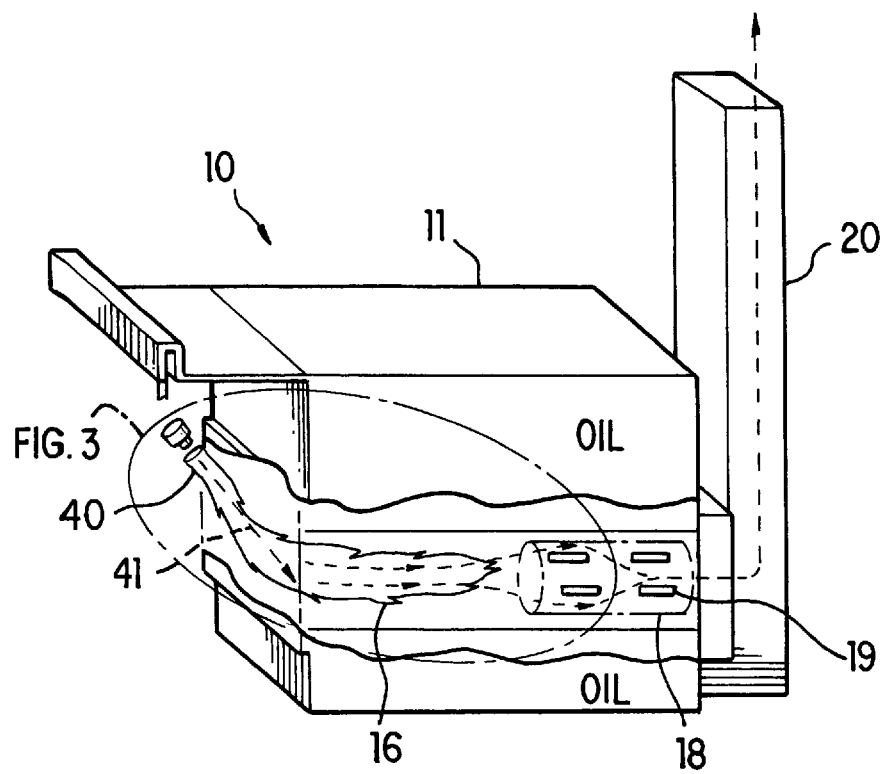
FIG. 2 is a diagram showing a fluid heating apparatus in accordance with one embodiment of this invention.
Figure 3:
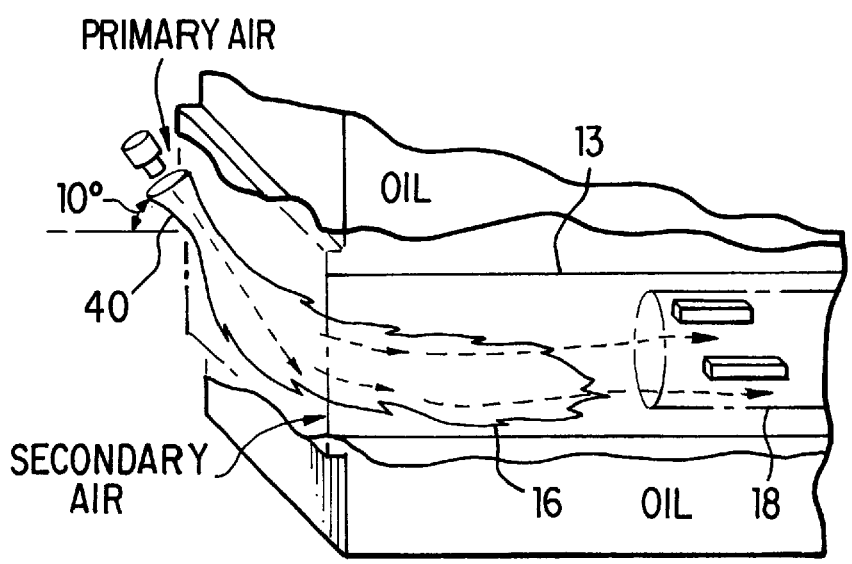
FIG. 3 is a diagram showing details of the combustion portion of the fluid heating apparatus of FIG. 2.

A hot oil flyer 10 in accordance with one embodiment of this invention is shown in FIG. 2 with an enlargement of the encircled portion shown in FIG. 3. In contrast to conventional hot oil fryers, the inspirator-type burner 40 is angled in a downward direction. In accordance with one preferred embodiment of this invention, burner 40 is angled at least 10° above horizontal. As a result of angling burner 40, the resulting flame 16 has a downward velocity component as indicated by arrow 41.

In accordance with one preferred embodiment of this invention, the dimensions and burner face of downward angled burner 40 are set to achieve good combustion at a primary combustion air amount greater than about 50% of the total amount of combustion air required for complete combustion of the fuel, to provide a substantial mixing length, and to create a burner face loading greater than about 10,000 Btu/hr/in-in. The combination of the downward orientation of downward angled burner 40 and tube baffle oven 18 comprising baffles 19, which baffles promote mixing of the secondary combustion air into the flame 16 and enhance both radiant and convection heat transfer from the combustion process to the combustion space or tube wall, results in a compact natural draft combustion system. Tests run using the natural draft combustion system of this invention resulted in improved fryer efficiency, in particular, an increase of about 5 to 10 efficiency points over a conventional tube fryer, while maintaining the same input rate per tube and without changing the physical dimensions of the fryer. Thus, more energy is provided to the hot oil or food while maintaining the original oil capacity, cooking zone, number of tubes and overall appliance dimensions.

Efficiency of the apparatus is determined by a standard water boil test in which the fluid container or tank portion of the fryer is filled with water. The water is heated and the weight of water boiled off determined. Knowing the latent heat of water and the amount of fuel required to boil off the water, the efficiency defined as (the latent heat of water x the amount of water boiled off)/the total amount of fuel consumed, can then be determined.

The key to the improvements achieved by the downward fired in-shot burner design of the heating apparatus of this invention is the angle at which the flame enters combustion space 13. Angling the introduction of the flame into combustion space 13 in this manner results in better heat transfer utilization of the combustion space because of the tendency of the flame to "attach" itself to the bottom of the combustion space before the normal buoyancy effects drive the flame toward the top of the combustion space. In a conventional natural draft fryer, the flame is generally disposed toward the top half of the combustion space or tube resulting in poor heat transfer use of the lower portion of the combustion space. In addition, the downward momentum of the flames resulting from the combustion system of this invention results in better mixing of the secondary combustion air into the flame, thereby producing a shorter, tighter flame that permits the use of a longer baffle oven 18 for improved efficiency. The additional burner length from using the angled burner results in a longer primary air/gas mixing section that reduces the flame length, a requirement for baffle enhancement. The longer burner also permits the use of a larger burner face (area), a feature which is desirable for producing a compact flame. The more compact the flame is, the higher the heat release is in the first portion of the combustion space which, in turn, increases the initial heat transfer from the flame to the combustion space wall. Again, the compact flame enables the use of larger baffles.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A natural draft combustion system comprising:
    a housing enclosing at least a portion of a material heating container and at least one combustion space in heat exchange relation with said material heating container and extending from a heat inlet side of said housing to a heat outlet side of said housing;
    a downward angled burner disposed on said heat inlet side having a burner outlet in fluid communication with a heat inlet to said at least one combustion space; and
    a natural draft combustion products exhaust conduit in fluid communication with said at least one combustion space proximate said heat outlet of said housing.

2. The system in accordance with claim 1, wherein said burner is angled at least 10° above a horizontal.

3. The system in accordance with claim 1, wherein said at least one combustion space is a firetube.

4. The system in accordance with claim 1 further comprising at least one baffle disposed within said at least one combustion space.

5. The system in accordance with claim 1, wherein said burner has a burner face loading greater than about 10,000 Btu/hr/in-in.

6. In a hot oil fryer comprising a housing enclosing at least a portion of a liquid container and at least one combustion space in heat exchange relation with said liquid container having a heat input side forming a heat inlet and an opposed heat output side forming a combustion products exhaust, a burner disposed on said heat input side having a burner outlet in fluid communication with said heat inlet, the improvement comprising:
    said burner being downwardly angled whereby a flame produced by said burner comprises a downward velocity component.

7. The fryer in accordance with claim 6, wherein said burner is angled above a horizontal by at least about 10°.

8. The fryer in accordance with claim 6, wherein a baffle is disposed within said combustion space.

9. The fryer in accordance with claim 6, wherein said combustion space is a firetube.

10. In a heating apparatus comprising a housing enclosing at least a portion of a fluid container, at least one combustion space extending from a heat inlet side to an opposed heat outlet side and having a heat inlet, said at least one combustion space being in heat exchange relation with said fluid container, and a burner having a burner outlet in fluid communication with said heat inlet, a method for heating a fluid in said fluid container comprising:

introducing a flame produced by said burner into said at least one combustion space through said heat inlet, said flame comprising a downward velocity component.

11. The method in accordance with claim 10, wherein said flame impinges upon a bottom of said at least one combustion space.

12. The method in accordance with claim 10, wherein said burner is a gaseous fuel burner providing at least about 50% of a total amount of combustion air required for complete combustion of a gaseous fuel flowing through said burner outlet.

13. The method in accordance with claim 12, wherein said gaseous fuel burner has a face loading greater than about 10,000 Btu/hr/in-in.

* * * * *